Patented Apr. 24, 1945

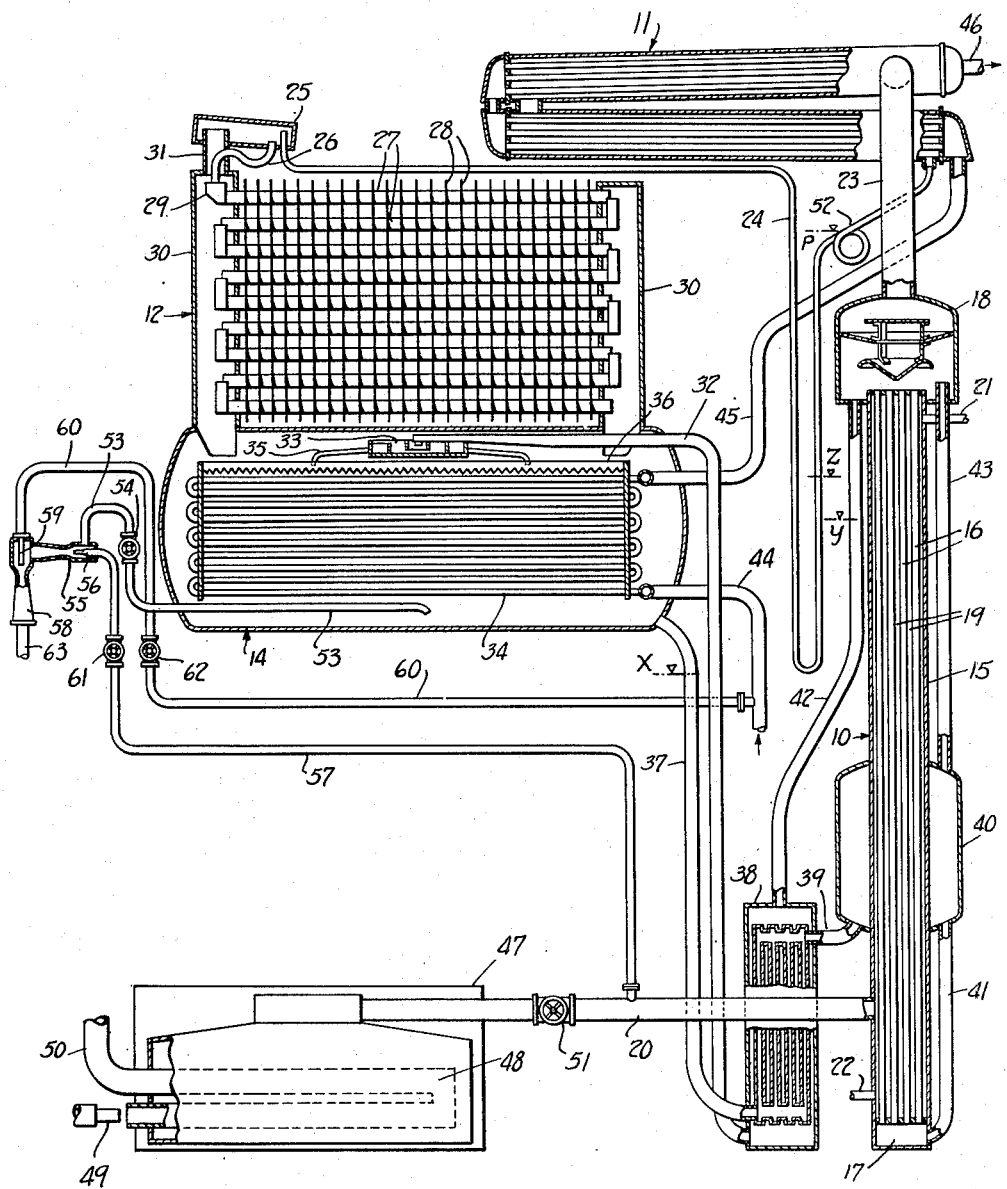

2,374,521

UNITED STATES PATENT OFFICE 2,374,521

REFRIGERATION

Philip P. Anderson, Jr., Evansville, Ind., assignor to Servel, Inc., New York, N. Y., a corporation of Delaware Application April 18, 1941, Serial No. 389,112

10 Claims. (Cl. 62—119)

This invention relates to refrigeration, and is particularly concerned with withdrawal of non-condensible gases from refrigeration systems operating at low pressures.

During operation of refrigeration systems non-condensible gases may collect in parts thereof to cause objectionable increase in pressure in the system. This is particularly true in refrigeration systems of the absorption type which operate at partial vacuum and at extremely low pressures. The increase in pressure in the refrigeration system, resulting from the collection of non-condensible gases, is undesirable because the efficiency of the system is lowered and normal operation thereof may be disturbed.

It is an object of this invention to provide an improvement for removing non-condensible gases from refrigeration systems. This is accomplished by employing a two-stage ejector type of vacuum pump, the first stage being operated by steam and the second stage being operated by water under suitable pressure.

The above and other objects and advantages of the invention will be better understood from the following description taken in conjunction with the accompanying drawing forming a part of this specification, and of which the single figure more or less diagrammatically illustrates a refrigeration system embodying the invention.

Referring to the drawing, the present invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressure and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20, as will be described presently. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes successively through the banks of tubes which are coupled by suitable end connections. The end connections are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32. The entering absorption liquid flows into a vessel 33 in which liquid is distributed laterally or cross-wise of a plurality of vertically disposed pipe banks 34 which are arranged alongside of each other. The liquid flows from vessel 33 through conduits 35 into a plurality of liquid holders and distributors 36 which extend lengthwise of and above the uppermost horizontal branches of pipe banks 34. Absorption liquid is siphoned over the walls of the liquid holders 36 to effect complete wetting of the uppermost pipe sections. Liquid drips from each horizontal pipe section onto the next lower pipe section, whereby all of the pipe sections are wetted with a film of liquid.

The water vapor formed in evaporator 12 passes through the headers 30 into the absorber 14 where it is absorbed by the absorption liquid and, due to such absorption of water vapor, the absorption liquid is diluted. The diluted absorption liquid flows through a conduit 37, a first passage in liquid heat exchanger 38, conduit 39, vessel 40 and conduit 41 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 42, a second passage in liquid heat exchanger 38, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity.

The vessel 40 is cylindrical in shape and disposed about shell 15 of generator 10. By arranging vessel 40 to receive heat derived from the steam in space 19, preheating of absorption liquid flowing to generator 10 is effected. The upper part of vessel 40 is connected by a conduit 43 to vessel 18, so that the pressure in vessel 43 is equalized with the pressure in the upper part of generator 10 and condenser 11.

The heat liberated with absorption of water vapor in absorber 14 is transferred to a cooling medium, such as water, for example, which flows upward through the vertically disposed pipe banks 34. The cooling medium enters the lower ends of the pipe banks 34 through a conduit 44 and leaves the upper ends of the pipe banks 34 through a conduit 45. The conduit 45 is connected to condenser 11 whereby the same cooling medium may be utilized to cool both condenser 11 and absorber 14, and from condenser 11 the cooling medium flows through a conduit 46 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 24 maintains the pressure differential between condenser 11 and evaporator 12, the liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of generator 10. In operation, the liquid columns may form in conduits 37, 42 and down-leg of tube 24 to the levels $x$, $y$ and $z$, for example. The conduits are of such size that restriction to gas flow is effected without appreciably restricting flow of liquid.

The liquid column formed in vessel 40 and conduit 41 provides the liquid reaction head for raising liquid in riser tubes 16 by vapor-lift action. The vessel 40 is of sufficient volume to hold the liquid differential in the system and is of such cross-sectional area that the liquid level therein does not appreciably vary, so that a substantially constant reaction head is provided for lifting liquid in generator 10.

The steam chamber 19 formed by jacket 15 of generator 10 constitutes a part of a heating system which includes the conduit 20 and a boiler 47. The boiler 47 is provided with a plurality of heating tubes 48 into the lower ends of which are adapted to project the flames of one or more burners 49. The burners 49 are supplied with a suitable combustible gas, and the hot products of combustion produced by the burner flames pass through the heating tubes 48 to heat the water in the boiler and produce steam. The hot gases pass from the tubes 48 to risers or flues 50. The steam formed in boiler 47 serves as a heating medium for the refrigeration system and flows through the conduit 20 to the steam chamber 19, a valve 51 being connected in the conduit to control flow of steam therethrough.

During operation of the refrigeration system non-condensible gases may collect therein, and in condenser 11 such gases flow toward the dead-end or bottom part of the condenser. To remove non-condensible gases from condenser 11 to the lower pressure side of the system, a liquid siphon trap 52 is provided in conduit 24, as described in my application Serial No. 350,883, filed August 3, 1940. The siphon trap 52 may be of any desired shape and is shown in the form of a complete circular loop in the down-leg of U-tube 24.

The liquid formed in condenser 11 flows into loop 52. When the circular loop is completely filled with liquid to the level $p$, the liquid is siphoned from the loop into the down-leg of U-tube 24. The gas in the down-leg of U-tube 24, between the loop 52 and liquid level $z$, is trapped by the liquid siphoned from the loop. Immediately after liquid has siphoned from the loop, gas passes from the bottom part of condenser 11 through the loop 52 into the down-leg of U-tube 24. When liquid flowing from condenser 11 again reaches the level $p$ in the circular loop 52, liquid is again siphoned into the down-leg of the tube 24. In this manner gas passing from condenser 11 into the down-leg of tube 24, before the liquid seal is formed in loop 52, is segregated by the liquid subsequently siphoned into the down-leg of the tube.

The gas segregated between the successive bodies of liquid siphoned from loop 52 is compressed by the siphoned liquid and passes through the U-tube by the gravity flow of liquid from condenser 11 to evaporator 12. In this way non-condensible gases collecting in the upper part of generator 10 and condenser 11 are removed or transferred from these parts of the system to the evaporator 12 and absorber 14 to which the vacuum pump embodying the present invention is connected for removing non-condensible gases from the refrigeration system.

In accordance with this invention a two-stage ejector type of vacuum pump is provided to withdraw non-condensible gases from absorber 14 through a conduit 53. The conduit 53 is provided with a valve 54 and extends into the bottom part of absorber 14. The open end of conduit 53 is disposed at an intermediate region of absorber 14 inasmuch as the non-condensible gases are swept by the high velocity of the water vapor to the center part of the absorber which is the farthest point in the path of flow for the gases from the lower ends of headers 30.

The end of conduit 53 outside of absorber 14 is connected to the inlet end of a Venturi tube 55 having a nozzle 56 and which serves as a first stage of an ejector to which steam is delivered at substantially atmospheric pressure from a suitable source of supply. Since generator 10 of the refrigeration system is supplied with steam at atmospheric pressure through conduit 20 from steam boiler 47, the conduit 57 through which steam is supplied to nozzle 56 of Venturi tube 55 is connected to conduit 20. The diverging side or discharge end of Venturi tube 55 is connected to the inlet or converging side of a second Venturi tube 58 having a nozzle 59 therein to which water under suitable pressure is delivered through a conduit 60. The Venturi tube 58 serves as the second stage of the ejector. The conduit 60 is connected to conduit 44 through which water flows from a suitable source of supply to effect cooling of absorber 14. Suitable valves 61 and 62 are connected in conduits 57 and 60, respectively, to control flow of steam and water to the two stages of the ejector.

When it is desired to remove non-condensible gases from the refrigeration system during operation of the latter, the steam and water supply valves 61 and 62 are opened to start operation of the two-stage ejector. After the pressure in conduit 53 is lowered sufficiently at the region between the throat of Venturi tube 55 and valve 54 by ejector action, the valve 54 is opened to permit withdrawal of gases from the bottom part of absorber 14. The withdrawn gases pass through conduit 53 and mix with steam discharged from the nozzle 56 in Venturi tube 55. The steam discharged from nozzle 56 acquires a high velocity to produce a suction effect for withdrawing gases from absorber 14. In the second stage the water passing through the nozzle 59 in Venturi tube 58 acquires a high velocity whereby a suction effect is produced to effect withdrawal of the steam and gas mixture from the Venturi tube 55 of the first stage. Condensation of steam occurs in Venturi tube 58 and the water, together with the condensate and non-condensible gases, are discharged through conduit 63 to atmosphere.

After substantially all of the non-condensible gases are removed from the refrigeration system, as may be determined by a suitable pressure indicating device, for example, the valve 54 is first closed to shut off the system from the atmosphere, and thereafter the steam and water supply valves 61 and 62 are closed.

A two-stage ejector of the character just described is particularly advantageous in that it is relatively inexpensive, and at the same time extremely low pressures can be produced by such a vacuum pump. In the kind of refrigeration system illustrated and described and in which the invention is embodied, the normal operating pressure in the absorber 14 may be as low as 5 to 6 mm. mercury. A partial vacuum of the low value just mentioned can readily be obtained with the two-stage ejector type vacuum pump illustrated an described. This is not true of an ordinary water ejector or aspirator because the pressure usually maintained in the absorber is lower than the vapor pressure of the water used in the ejector. In the two-stage ejector described above, the water may be supplied to the second stage from the usual source of city supply which may be at a pressure of about 30 pounds per square inch or higher.

While a single embodiment of the invention has been shown and described, it will be apparent to those skilled in the art that various modifications and changes may be made without departing from the spirit and scope of the invention, as pointed out in the following claims.

What is claimed is:

1. In an absorption type refrigeration system having a plurality of interconnected parts including an evaporator in which evaporation of liquid refrigerant takes place, an absorber comprising an elongated vessel having openings at opposite ends through which refrigerant vapor is introduced from said evaporator, and a heat receiving part, means to heat said heat receiving part by steam delivered from a source of supply, means to effect cooling of said absorber by cooling water delivered from a source of supply, a vacuum pump, and a conduit connecting said pump and an intermediate region of said vessel constituting the farthest point in the path of flow of non-condensible gases swept into such region by the refrigerant vapor, said vacuum pump comprising a two-stage ejector, the first stage of said ejector being operable by steam from said source of supply and the second stage of said ejector being connected to said first stage and operable by water supplied thereto under pressure from its source of supply.

2. In an absorption type refrigeration system having a plurality of interconnected vessels normally maintained at a partial vacuum and including a vessel into the upper part of which is introduced refrigerant vapor, a vacuum pump, and a conduit connecting said pump and a region at or adjacent to the bottom part of said vessel and to which region non-condensible gases are swept and tend to collect by the sweeping effect of the refrigerant vapor introduced into said vessel, such region in the bottom part of said vessel connected to said pump by said conduit normally being a part of the vapor space in said vessel, said vacuum pump comprising an ejector operable by steam to effect removal of non-condensible gases through said conduit from said region.

3. In an absorption type refrigeration system having a plurality of interconnected parts normally maintained at a partial vacuum and including a vessel into which is introduced refrigerant vapor, a vacuum pump, and a conduit connecting said pump and said vessel, said vacuum pump comprising a two-stage ejector operable to effect removal of non-condensible gases through said conduit from said vessel, the first stage of said ejector being operable by vapor and the second stage of said ejector being connected to said first stage and operable by liquid supplied thereto under pressure.

4. In a refrigeration system of the absorption type having a plurality of interconnected parts including an evaporator in which evaporation of liquid refrigerant takes places, an absorber in open communication with said evaporator and into which absorption solution is conducted, and a heat receiving part, means to heat said heat receiving part by a heating medium delivered from a source of supply, a vacuum pump, a conduit connecting said pump and a region of said absorber constituting the farthest point in the path of flow of non-condensible gases swept into such region by the refrigerant vapor formed in said evaporator, means for delivering heating medium from said source of supply to said pump, said vacuum pump utilizing the heating medium to effect removal of non-condensible gases through said conduit from said region, a control in said conduit for controlling the removal of non-condensible gases from the system by said pump, and another control for controlling the delivery of heating medium to said pump.

5. In a refrigeration system of the absorption type having a plurality of interconnected parts including a vessel into which refrigerant vapor is introduced and a heat receiving part, means to heat said heat receiving part by a heating medium delivered from a source of supply, a vacuum pump, a conduit connecting said pump and a region of said vessel constituting the farthest point in the path of flow of non-condensible gases swept into such region by the refrigerant vapor introduced into said vessel, and means for delivering heating medium from said source of supply to said pump, said vacuum pump utilizing the medium to effect removal of non-condensible gases through said conduit, a control in said conduit for controlling removal of non-condensible gases from the system by said pump, and another control for controlling the delivery of heating medium to said pump.

6. In an absorption type refrigeration system having a plurality of interconnected parts including a heat rejecting part into which refrigerant vapor is introduced and a heat receiving part, means to heat said heat receiving part by a heating medium delivered from a source of supply, means to effect cooling of said heat rejecting part by cooling water delivered from a source of supply, a vacuum pump, a conduit connecting said pump and said heat rejecting part, means for delivering heating medium from said source of supply to said pump, and means for delivering cooling water from said source of supply to said pump, said pump utilizing the heating medium and water to effect removal of non-condensible gases from the refrigeration system through the conduit.

7. In an absorption type refrigeration system having a plurality of interconnected parts including a heat rejecting part into which refrigerant vapor is introduced and a heat receiving part, means to heat said heat receiving part by a heating medium delivered from a source of supply, a vacuum pump, a conduit connecting said vacuum pump and said heat rejecting part and through which non-condensible gases are removed from the system by said pump, said vacuum pump comprising a two-stage ejector, means for delivering heating medium from said source of supply to the first stage of said ejector, and means for delivering water to said second stage of said ejector, said ejector utilizing the heating medium and water to effect removal of non-condensible gases from the refrigeration system through said conduit.

8. In an absorption type refrigeration system having a plurality of parts interconnected for flow of fluids therein and including a heat rejecting part and a heat receiving part, a steam boiler connected to deliver steam to heat said heat receiving part, means to effect cooling of said heat rejecting part by cooling water delivered from a source of supply, a vacuum pump, a conduit connecting said vacuum pump and a region of said system into which non-condensible gases are swept by fluid flowing in the system, said vacuum pump comprising a two-stage ejector, means for delivering steam from said boiler to said first stage of the ejector, and means for delivering water from said source of supply to said second stage of the ejector, said vacuum pump utilizing the steam and water to effect removal of non-condensible gases from the refrigeration system through said conduit.

9. In an absorption type refrigeration system having a plurality of interconnected parts including a heat receiving part, an evaporator in which evaporation of liquid refrigerant takes place in a partial vacuum, an absorber always in open communication with said evaporator and comprising an elongated vessel having openings at opposite ends through which refrigerant vapor is introduced at high velocity from said evaporator, means to introduce absorption liquid into said vessel, means to heat said heat receiving part by a vaporous heating medium delivered from a source of supply, a vacuum pump, a conduit connecting said pump and an intermediate region of said vessel constituting the farthest point in the path of flow of non-condensible gases swept into such region by the refrigerant vapor, and means for delivering the vaporous heating medium from said source of supply to said vacuum pump, said vacuum pump utilizing the vaporous heating medium to effect removal of non-condensible gases from said refrigeration system through said conduit.

10. In an absorption type refrigeration system having a plurality of interconnected vessels normally maintained at a partial vacuum and including a first vessel, into the upper part of which is introduced refrigerant vapor, and a heat receiving vessel, means to heat said heat receiving vessel by a heating medium delivered from a source of supply, a vacuum pump, a conduit connecting said pump and a region at or adjacent to the bottom part of said first vessel and to which region non-condensible gases are swept and tend to collect by the sweeping effect of the refrigerant vapor introduced into said first vessel, such region in the bottom part of said first vessel connected to said pump by said conduit normally being a part of the vapor space in said first vessel, and means for delivering heating medium from said source of supply to said vacuum pump, said vacuum pump utilizing the heating medium to effect removal of non-condensible gases from the refrigeration system through said conduit.

PHILIP P. ANDERSON, Jr.